US011164266B2

(12) United States Patent
Arandia et al.

(10) Patent No.: US 11,164,266 B2
(45) Date of Patent: Nov. 2, 2021

(54) PROTECTION OF WATER PROVIDING ENTITIES FROM LOSS DUE TO ENVIRONMENTAL EVENTS

(71) Applicant: International Business Machines Corporation, Armonk, NY (US)

(72) Inventors: Ernesto Arandia, Dublin (IE); Fearghal O'Donncha, Aran Islands (IE); Emanuele Ragnoli, Chapelizod (IE); Seshu Tirupathi, Phoenix Park Racecourse (IE)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 15/795,984

(22) Filed: Oct. 27, 2017

(65) Prior Publication Data

US 2019/0130500 A1    May 2, 2019

(51) Int. Cl.
*G06Q 50/06* (2012.01)
*G06Q 40/06* (2012.01)
*G06Q 10/06* (2012.01)
*G06Q 90/00* (2006.01)

(52) U.S. Cl.
CPC ......... *G06Q 50/06* (2013.01); *G06Q 10/0635* (2013.01); *G06Q 40/06* (2013.01)

(58) Field of Classification Search
None
See application file for complete search history.

(56) References Cited

U.S. PATENT DOCUMENTS

| 6,546,375 | B1 | 4/2003 | Pang et al. |
| 7,437,323 | B1 | 10/2008 | Valkov et al. |
| 7,774,226 | B2 | 8/2010 | Kalagnanm et al. |
| 7,945,500 | B2 | 5/2011 | Fell et al. |
| 8,630,941 | B2 | 1/2014 | Johnston et al. |

(Continued)

FOREIGN PATENT DOCUMENTS

WO    2010/011892 A2    1/2010

OTHER PUBLICATIONS

Conlon, T, Cross-correlation dynamics in financial time series, Mar. 2009, Physica A: Statistical Mechanics and its Applications (Year: 2009).*

(Continued)

*Primary Examiner* — Patricia H Munson
*Assistant Examiner* — V K Puri
(74) *Attorney, Agent, or Firm* — Scully, Scott, Murphy & Presser, P.C.; Kurt P. Goudy

(57) ABSTRACT

The protection of water providing entities from loss due to environmental events is disclosed including receiving structured and unstructured data related to a water resource, generating time series for a plurality of index items, generating training data and testing data based on the time series for the plurality of index items, determining correlations between the time series of the index items using the generated training data, determining a classification boundary as a strike level based on the determined correlation, generating a protection strategy based on the strike level, applying the protection strategy to the testing data to generate a resulting data time series, and presenting the resulting data time series via a display of a computing device to at least one user of the computing device.

17 Claims, 13 Drawing Sheets

(56) References Cited

U.S. PATENT DOCUMENTS

| | | | |
|---|---|---|---|
| 9,002,741 B2 | 4/2015 | Rohlfs | |
| 9,202,252 B1 | 12/2015 | Smith et al. | |
| 2008/0313067 A1 | 12/2008 | Fell et al. | |
| 2010/0023442 A1 | 1/2010 | O'Hara et al. | |
| 2010/0138363 A1 | 6/2010 | Batterberry et al. | |
| 2011/0182668 A1* | 7/2011 | Hogan | G06Q 10/06315 405/80 |
| 2012/0246104 A1* | 9/2012 | Di Sciullo | G06Q 50/01 706/46 |
| 2014/0108215 A1* | 4/2014 | Kirsch | G06Q 40/04 705/37 |
| 2014/0142904 A1* | 5/2014 | Drees | G06Q 50/06 703/2 |
| 2016/0063402 A1* | 3/2016 | Webb | G06Q 10/063 705/348 |
| 2016/0253595 A1* | 9/2016 | Mathur | A01G 22/00 706/12 |
| 2017/0161758 A1* | 6/2017 | Towriss | G06N 20/00 |
| 2017/0270454 A1* | 9/2017 | Rooney | E21B 41/00 |
| 2017/0270621 A1* | 9/2017 | Fleming | G06Q 50/06 |
| 2017/0270624 A1* | 9/2017 | Rooney | G06Q 20/14 |
| 2018/0122012 A1* | 5/2018 | Vandenbussche | G06Q 40/06 |

OTHER PUBLICATIONS

"Asset Pricing Data Services", https://financial.thomsonreuters.com/en/products/data-analytics/pricing-data-services.html, Printed on Oct. 23, 2017, 4 pages.

"QuantLib: a free/open-source library for quantitative finance", http://quantlib.org/index.shtml, Printed on Oct. 23, 2017, 2 pages.

Zeff, H.B.., et al., "Managing water utility financial risks through third-party index insurance contracts", http://onlinelibrary.wiley.com/doi/10.1002/wrcr.20364ull, Water Resources Research, An AGU Journal, Aug. 12, 2013, Printed on Oct. 23, 2017, 25 pages, vol. 49, Issue 8.

Brown, C., et al., "Managing hydroclimatological risk to water supply with option contracts and reservoir index insurance", http://onlinelibrary.wiley.com/doi/10.1029/2007WR006093/full, Water Resources Research, An AGU Journal, Nov. 29, 2007, Printed on Oct. 23, 2017, 23 pages, vol. 43, Issue 11.

"Sustainable Utilities: Financial Instruments to Manage Weather-Related Revenue Risk", Alliance for Water Efficiency, http://www.financingsustainablewater.org/resource-search/sustainable-utilities-financial-instruments-manage-weather-related-risk, Jul. 2014, 56 pages.

McGee, S., "Companies proclaim water the next oil in a rush to turn resources into profit", https://www.theguardian.com/money/2014/jul/27/water-nestle-drink-charge-privatize-companies-stocks, Jul. 27, 2014, Printed on Oct. 23, 2017, 6 pages.

\* cited by examiner

*U.S Drought Monitor*
West

*Drought Conditions (Percent Area)*

|  | None | D0-D4 | D1-D4 | D2-D4 | D3-D4 | D4 |
|---|---|---|---|---|---|---|
| Current | 64.95 | 35.05 | 16.11 | 7.19 | 3.71 | 0.28 |
| Last Week 1/3/2017 | 54.19 | 45.81 | 21.51 | 8.53 | 5.11 | 2.44 |
| 3 Months Ago 10/11/2016 | 37.98 | 62.02 | 27.14 | 12.09 | 5.73 | 2.81 |
| Start of Calendar Year 1/3/2017 | 54.19 | 45.81 | 21.51 | 8.53 | 5.11 | 2.44 |
| Start of Water Year 9/27/2016 | 27.78 | 72.22 | 30.95 | 13.45 | 5.77 | 2.81 |
| One Year Ago 1/12/2016 | 36.54 | 63.46 | 42.40 | 25.31 | 13.09 | 6.56 |

<u>Intensity:</u>

- D0 Abnormally Dry
- D1 Moderate Drought
- D2 Severe Drought
- D3 Extreme Drought
- D4 Exceptional Drought Financial Reprts

FIG. 9

PROTECTION OF WATER PROVIDING ENTITIES FROM LOSS DUE TO ENVIRONMENTAL EVENTS

BACKGROUND

The present disclosure relates to the protection of municipalities or other water providing entities against loss due to environmental events that may affect their ability to operate.

The availability of water from water resources such as aquifers, reservoirs, streams, or other similar water resources, may be variable over both long and short periods of time. For example, water resources availability may be affected by environmental effects such as rainfall, snow melt, drought, evaporation, or other similar environmental effects. For example, during a prolonged drought, the available water resources may be reduced while heavy rainfall or snow may replenish such water resources. Water resource availability may also be effected by consumption or demand for use of the water resources, e.g., by households, municipalities, businesses, farm irrigation, or other similar demands. In some cases, the water resource availability may be significantly affected by a combination of environmental effects and consumption or demand. For example, during drought conditions, a farmer's irrigation needs may increase thereby increasing consumption of the water resources. As another example, when significant rainfall occurs the farmer has little need for irrigation so consumption of the water resource by the farmer decreases.

A municipality or water providing entity often controls the storage and consumption of water resources and utilizes a revenue stream generated from such consumption to fund activities, operating costs, and infrastructure related to the water resources. However, due to the variability of both environmental effects and consumption or demand on the availability of water resources, there may be a risk that the revenue of the municipality's water resources, e.g., based on volume of water sold, may go negative as a result of a particular environmental effect, such as a year with rainfall above a threshold amount where not as much water may be consumed.

An example of a municipality protecting itself against environmental effects, in 2012, a relatively large municipality in Texas purchased a weather contingent power contract for the summer period. This contract paid out in increasing size the hotter the daily maximum temperature (at a defined set of locations) was on weekdays. However, if the daily maximum temperature failed to reach a relatively high and pre-defined level (i.e., a "strike level") on a given day, no payout occurred. The contract offered protection from prices potentially increasing to the regulatory cap on a given day of $4,000 per MWh that could have cost the municipality tens of millions of dollars if the risk management was not in place.

In another example of a municipality protecting itself against environmental effects, a pure rainfall contract that protected against the lack of rainfall was purchased by a large municipality in California. The payout was defined in $/inch of rainfall below a certain low strike level. The potential annual payout was $50M. In order to avoid the premium, the municipality offered to pay the risk taker when the water levels were higher than a certain high strike level. This first-of-a-kind contract traded initially in 1999 and became a multi-year contract that eventually contributed to a market evolution in the form of a weather contingent natural gas price collar structure.

BRIEF SUMMARY

The system, method, and computer program product described herein provide ways to protect a municipality or other water providing entity from loss due to environmental events that may affect their ability to operate.

In some aspects of the present disclosure, a method is disclosed. The method includes receiving structured and unstructured data related to a water resource from one or more data sources and generating time series for a plurality of index items in the structured and unstructured data. At least one of the time series for the plurality of index items includes financial data of a water providing entity over a pre-determined period of time. The method further includes generating training data and testing data based on the time series for the plurality of index items, determining correlations between the financial data time series and at least one other time series of the index items using the generated training data, determining a classification boundary based on the determined correlation between the financial data time series and the at least one other time series of the index items, setting the classification boundary as a strike level, generating a hedging strategy based on the set strike level, applying the hedging strategy to the testing data to generate a resulting financial data time series that takes into account the hedging strategy, and presenting the resulting financial data time series via a display of a computing device to at least one user of the computing device.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can be understood by referring to the accompanying drawings, in which like reference numbers and designations refer to like elements.

Figure 9:
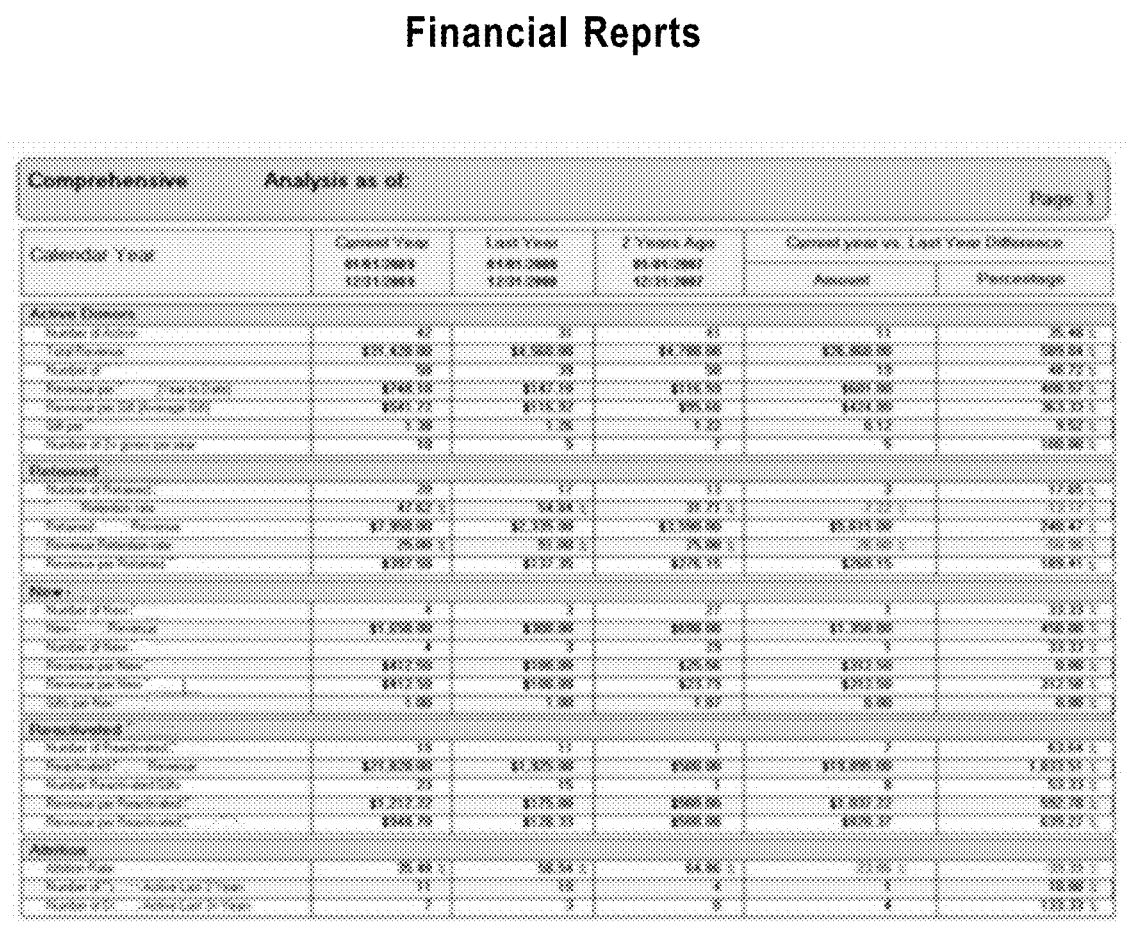

FIGS. 6-9 are diagrams of example data that may be obtained from a data source in accordance with some aspect of the present disclosure.

DETAILED DESCRIPTION

Disclosed are ways to allow municipalities or other water providers to protect themselves against the effects of the environment on water resources. While described with reference to municipalities, the present disclosure may relate to any entity that controls the distribution of water resources.

Figure 1:
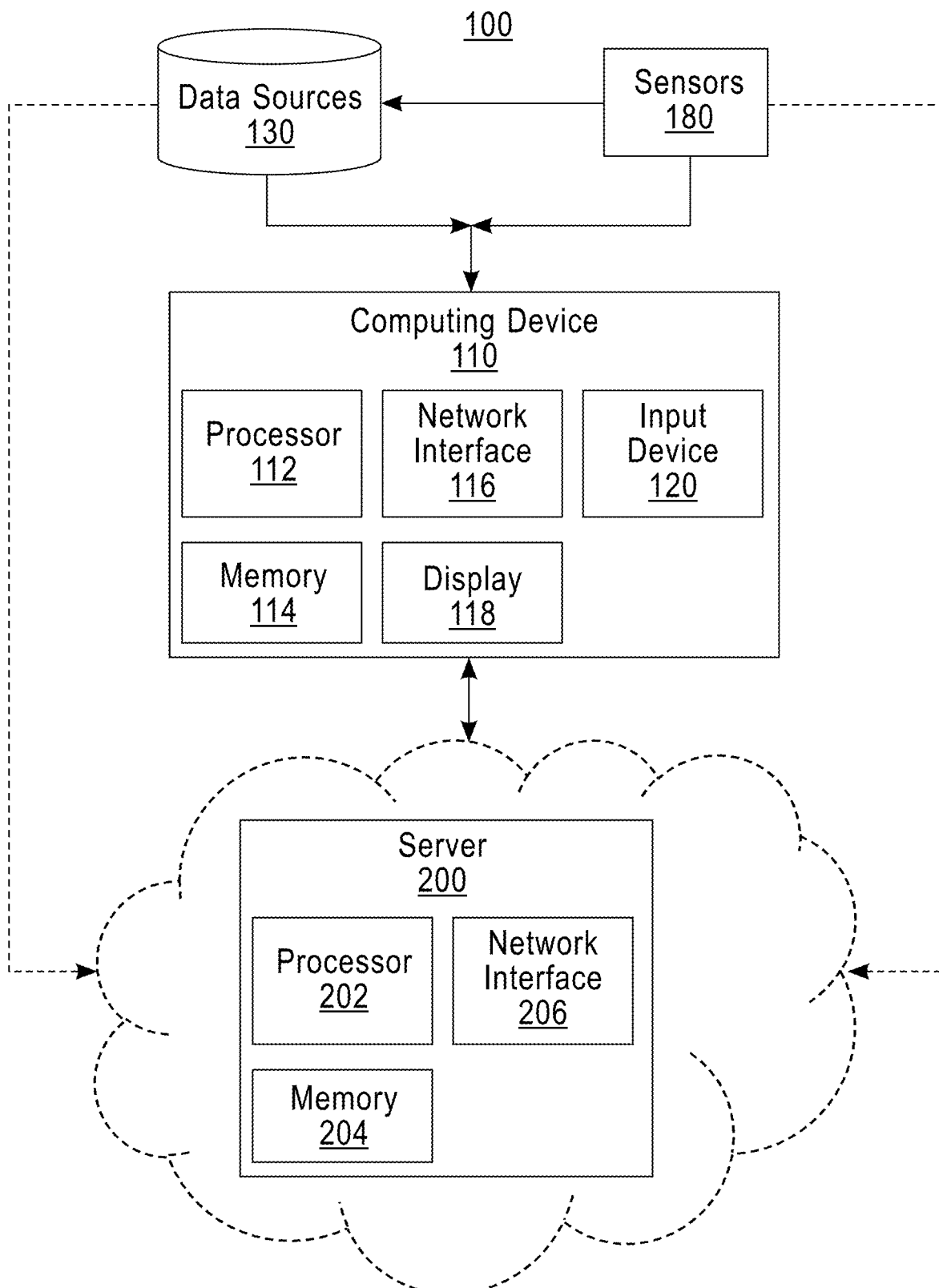
FIG. 1 is a system diagram illustrating a system for protecting a water providing entity in accordance with some aspects of the present disclosure.

With reference now to FIG. 1, a cognitive system 100 is illustrated that combines information about water resource characteristics, e.g., aquifers, streams, reservoirs, etc., water demand, financial instruments, and water pricing with machine learning (ML) to protect and guide municipalities in the water sector from catastrophic weather effects. The system is configured to acquire and ingest real-time and historical structured and unstructured data about water resources, water consumption, available financial instruments, or other similar data, and to perform predictive analysis of water resource availability and consumption. The system utilizes information on financial instruments related to water pricing and financial hedging instruments to generate scenarios and strategies for guiding investment decisions that minimize expected financial risks to the municipality by taking into account the real-time and historical structured and unstructured data.

System 100 may include, for example, one or more computing devices 110, data sources 130, sensors 180, and in some aspects, one or more servers 200.

Each computing device 110 includes at least one processor 112, memory 114, at least one network interface 116, a display 118, an input device 120, and may include any other features commonly found in a computing device. In some aspects, computing device 110 may, for example, be a computing device associated with a municipality that manages water resources and may be configured to present a user with one or more strategies for protecting the municipality from catastrophic environmental effects. In some aspects, computing device 110 may include, for example, a personal computer, laptop, tablet, smart device, smart phone, smart watch, or any other similar computing device that may be used by a user.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114. In some aspects, processor 112 may include more than one processor 112 located together or in a distributed fashion where each processor 112 may be configured to execute some, all, or none of the instructions.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information to and from data sources 130, sensors 180, server 200 or any other computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from data sources 130, sensors 180, or server 200. In some aspects, network interface 116 may be configured to communicate via the Internet.

Display 118 may include any display device that is configured to display information to a user of computing device 110. For example, in some aspects, display 118 may include a computer monitor, television, smart television, or other similar displays. In some aspects, display 118 may be integrated into or associated with computing device 110, for example, as a display of a laptop, smart phone, smart watch, or other smart wearable devices, as a virtual reality headset associated with computing device 110, or any other mechanism for displaying information to a user. In some aspects, display 118 may include, for example, a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Figure 2:
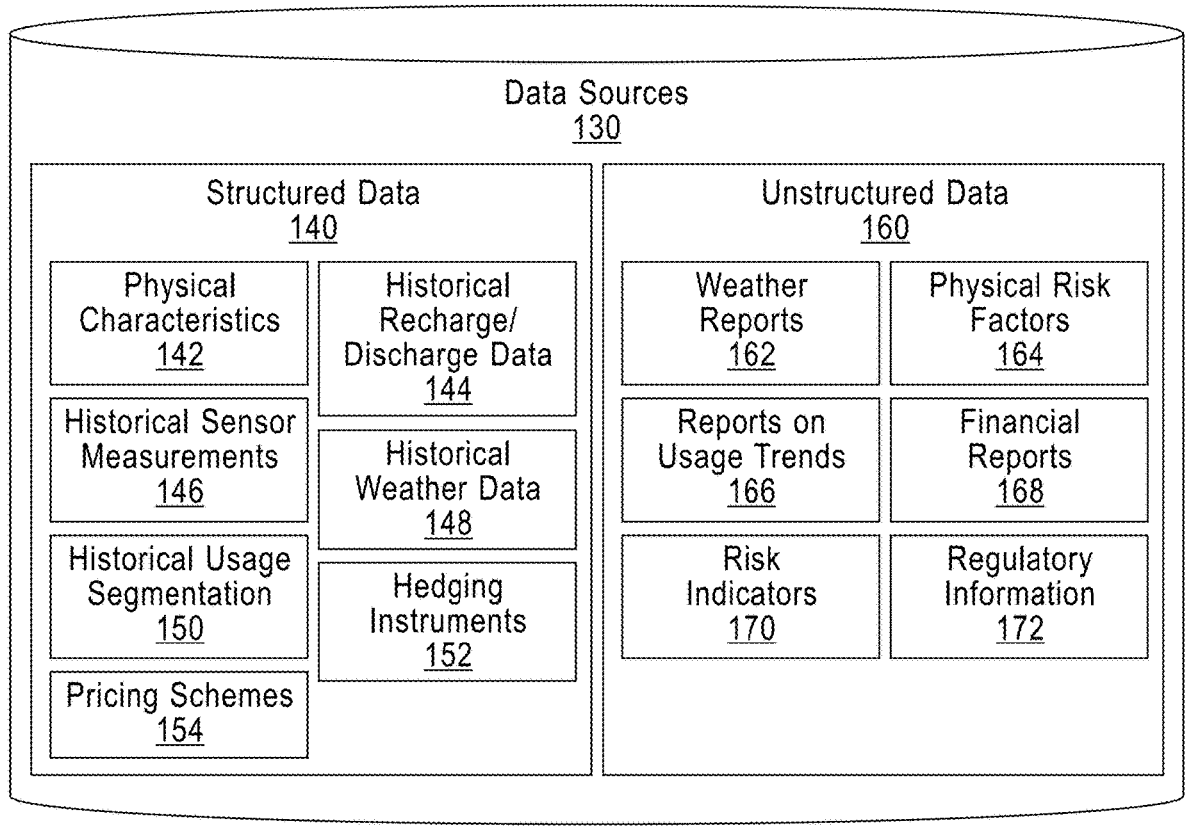
FIG. 2 is a system diagram further illustrating data sources and sensors of the system of FIG. 1 in accordance with some aspects of the present disclosure.

With reference to FIGS. 1 and 2, system 100 may include one or more data sources 130 from which data may be acquired and ingested. Data sources 130 may be co-located or distributed in any fashion. For example, one of data sources 130 may include one or more databases of the municipality that store water resource related information gathered by the municipality. In another example, one or more of data sources 130 may include a weather station or database that stores weather related information. In another example, one or more of data sources 130 may be associated with a news or weather organization that stores weather reports. In yet another example, one or more of data sources 130 may include a financial institution or database that includes financial data relating to water resources, e.g., quarterly/yearly financial reports filed by the water supplier/water utility that may be mined in search of relevant financial parameters such as revenue, profit, etc. In some aspects, one or more of data sources 130 may include internet web pages from which information may be gathered or ingested. Any other data source 130 that provides data related to water resources may be used.

In some aspects, with reference to FIG. 2, data sources 130 may store structured data 140 such as, for example, physical characteristics 142 of water resources, recharge/discharge data 144 for water resources, historical sensor measurements 146 for water resources, historical weather data 148, historical water resource usage segmentation data 150, data 152 about available financial hedging instruments, data 154 about available financial pricing schemes, or other structured data that may be used to determine a strategy for protecting a water resource municipality.

In some aspects, with continued reference to FIG. 2, data sources 130 may store unstructured data 160 such as, for example, weather reports 162, physical risk factors 164, reports on usage trends 166, financial reports 168, risk indicators 170, regulatory information 172, or other unstructured data that may be used to determine a strategy for protecting a water resource municipality.

Figure 3:
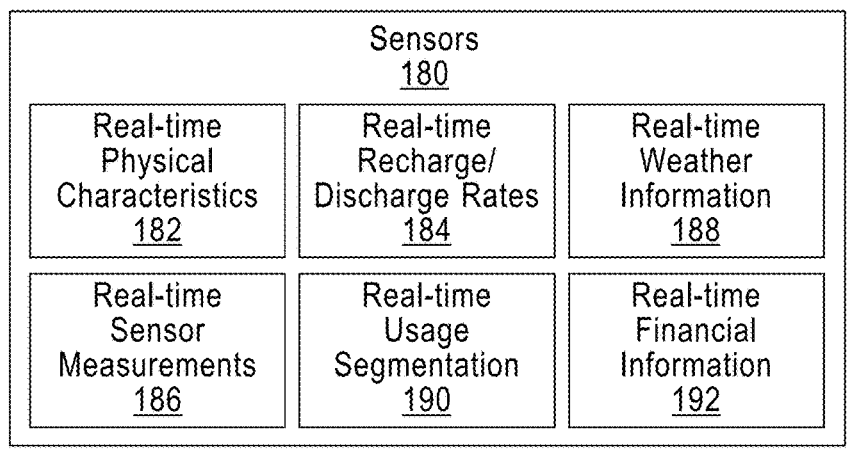
FIG. 3 is a system diagram further illustrating sensors of the system of FIG. 1 in accordance with some aspects of the present disclosure.

In some aspects, with reference to FIGS. 1 and 3, sensors 180 may generate real-time data related to water resources, weather, financial instruments, or other data that may be used to determine a strategy for protecting a water resource municipality. In some aspects, the data generated by sensors 180 may be provided to one or more of data sources 130 for storage and later use by computing device 110 or server 200. In some aspects, for example, data generated by sensors 180 may be provided directly to computing device 110 or server 200.

In some aspects, for example, sensors 180 may generate data about real-time physical characteristics 182 of water resources, real-time recharge/discharge rates 184 for water resources, other real-time sensor measurements 186 for water resources, real-time weather information 188, real-time water resource usage segmentation 190 for the water resources, real-time financial information 192 about available financial instruments or any other data that may be used to determine a strategy for protecting a water resource municipality.

In some aspects, sensors 180 may include, for example, temperature sensors, flow rate sensors, water resource level sensors, weather sensors including, for example, rainfall sensors, weather pattern sensors such as radar or other similar sensors, buoys, satellites, electronic or software sensors that are configured to generate data based on digital information or network traffic, or any other type of sensor that may sense, generate, and provide the above mentioned data or any other data that may be used to determine a strategy for protecting a water resource municipality.

In some aspects, sensors 180 may, for example, include smart sensors that are configured to communicate via a wired or wireless with computing device 110, data sources 130, or server 200. For example, sensors 180 may be Internet-of-Things (IoT) sensors that are connected wired or wirelessly to computing device 110, data sources 130, server 200, the Internet, the Cloud or any combination thereof.

Server 200 includes a processor 202, memory 204, and a network interface 206 that may include similar functionality as processor 112, memory 114, and network interface 116. In some aspects, server 200 may, for example, be any computing device, server, or similar system that is configured to interact with or provide data to computing device 110. In some aspects, one or more of servers 180 may be accessible via the cloud.

In some aspects, computing device 110 or server 200 may include one or more components that are configured to perform data processing, natural language processing, or other similar functions. In some aspects, for example, computing device 110 or sever 200 may include hardware or software configured to perform machine learning (ML) algorithms. In some aspects, the ML algorithms may be trained using data from data sources 130, sensors 180, or any combination thereof. In some aspects, the ML algorithms may be trained using data from other sources including, for example, the internet or the cloud.

In some aspects, computing device 110 may receive or gather data from data sources 130 or sensors 180 and may provide or forward the gathered or received data to server 200, e.g., using network interfaces 116 and 206. In some aspects, data from data sources 130 or sensors 180 may be provided to server 200 directly without first being forwarded to server 200 by computing device 110.

System 100 may be configured to guide and protect municipalities in the water sector by combining relevant structured and unstructured data with machine learning (ML) based analysis.

Figure 4:
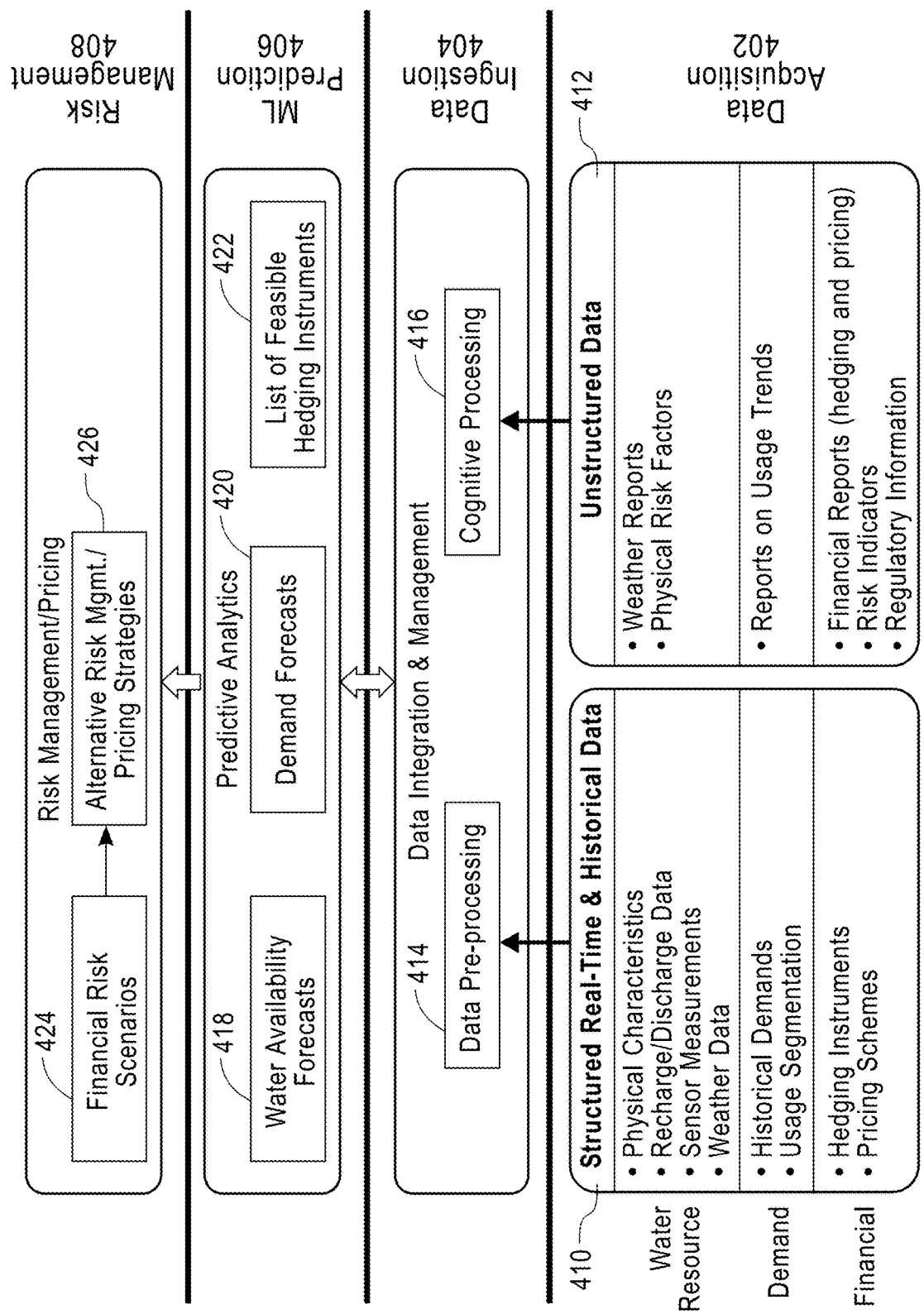
FIG. 4 is a system architecture in accordance with some aspects of the present disclosure.

With reference now to FIG. 4, an example architecture for the operation of system 100 is illustrated including data acquisition layer 402, data ingestion layer 404, ML prediction layer 406, and risk management 408 layer.

In data acquisition layer 402, system 100 acquires or receives structured data 410 and unstructured data 412 from a variety of sources including, for example, the data sources 130 and sensors 180 described above. For example, the structured data 410 and unstructured data 412 may be acquired by computing device 110 or server 200.

In data ingestion layer 404, system 100 performs data pre-processing 414 on the structured data 410 and performs cognitive processing 416 on the unstructured data 412.

Data pre-processing 414 may include, for example, parsing or data mining the structured data for specific information such as numerical values corresponding to water levels, recharge/discharge rates, water resource demand levels, water pricing, rainfall amounts, usage segmentation, municipal income from water resources, municipal budgets, operating expenses, hedging mechanisms or schemes, or other similar data. In some aspects, the structured data may be time-based data or historical data. In some aspects, the hedging schemes may be related to water resources. In some aspects the hedging schemes may not be related to water resources. In some aspects, statistical analysis may be performed on the structured data.

In some aspects, for example, data pre-processing may include standard operations such as, e.g., data cleaning, data integration, data transformation, data reduction, data discretization, or other standard operations.

Data cleaning may be utilized to fill in missing values, e.g., missing values in time series of water demand, identify outliers and smooth out noisy data, e.g., apply an adaptive moving average filter to remove noise from sensor data on levels of available water resource, and correct inconsistent data, e.g., flag and remove time series values where demand is larger than available supply. Each of these processes may be performed individually or in any combination.

Data integration may be utilized to use and combine multiple data sources, e.g., historical data about water levels in an aquifer may be combined with sensor data taken from IoT aquifer water level sensors for the purpose of calculating a water balance.

Data transformation may be utilized to apply normalization, e.g., scaling attribute values to fall within a specified range or scaling by using mean and standard deviation, aggregation of time series data, e.g., moving up in the concept hierarchy on numeric attributes, generalization, e.g., moving up in the concept hierarchy on nominal attributes, and attribute construction, e.g., replacing or adding new attributes inferred by existing attributes. Each of these processes may be performed individually or in any combination.

Data reduction may be utilized to reduce the number of attributes, e.g., applying principal component analysis in search for a lower dimensional space that may best represent the data, and reducing the number of attribute values, e.g., clustering to group values in clusters. Each of these processes may be performed individually or in any combination.

Data discretization may be utilized to perform unsupervised discretization, e.g., equal interval binning to construct time series at regular intervals, supervised discretization, e.g., defining class variables and boundaries and classifying values accordingly, and generating concept hierarchies, e.g., applying discretization/partitioning in a recursive manner. Each of these processes may be performed individually or in any combination.

Any of data cleaning, data integration, data transformation, data reduction, and data discretization may be performed individually or in any combination.

In some aspects, data pre-processing may utilize statistical analysis to output clean and operable data sets. For example, data cleaning techniques, normalization techniques, data reduction techniques such as, e.g., principal component analysis, and data discretization techniques such as e.g., supervised discretization, may utilize statistical analysis.

Cognitive processing 416 may, for example, include performing natural language processing (NLP) on the unstructured data 412 to determine the contents of the unstructured data 412. In some aspects, for example, the NLP may be performed on computing device 110. In some aspects, the unstructured data 412 may be transmitted to server 200 and the NLP may be performed by server 200. For example, in some aspects, the NLP may be performed by a dedicated NLP system such as, e.g., IBM Watson®. For example, the UNDERSTANDING™ features of IBM Watson® may be applied to unstructured data. NLP may be utilized, for example, to uncover insights by analyzing text such as, e.g., written water supplier financial reports, to extract data/metadata from content such as, e.g., concepts, entities, keywords, categories, relations, and semantic roles.

In some aspects, the processing of the acquired structured data 410 and unstructured data 412 may generate a time series for each data item. For example, water demand, net income from water resources sales, precipitation, recharge/discharge information, weather information, etc., may be processed to generate a time series for each data item over a period of time, e.g., days, months, years, for the last 2 years, 5 years, 10 years, or any other period of time. For example, the pre-processing of the structured data 410 and cognitive processing of the unstructured data 412 may transform the acquired data into structured data having similar comparable properties (e.g., the period of time in the time series) that allows ML prediction layer 406 to determine correspondences in the data.

By ingesting heterogeneous data that may be structured or unstructured, a large number of factors may be considered by system 100 for use in determining a strategy for protecting the municipality from catastrophic environmental effects.

The ingested data may be used to train a ML module. For example, the ML module may be trained using clustering through multivariate statistical techniques and via kernel methods for unsupervised learning. In some aspects, additional or alternative techniques for training the ML module may be utilized including, for example, logistic regression, support vector machine (SVM), Naive Bayes, K-Nearest Neighbors (KNN), K-means, deep learning, or other similar ML training techniques.

In ML prediction layer 406 the trained ML module is applied to generated time series of water availability forecasts 418, demand forecasts 420, and a list of feasible hedging instruments 422 to protect the municipality against any potential losses due to the water availability forecasts 418 and demand forecasts 420.

In some aspects, for example, the ML prediction layer may include two modules, a learning module, and a classification module. The learning module may, for example, analyze the training data to find patterns in the price series, i.e., the series that represents revenue or profit, find relationships, e.g., correlations, between price and risk generating variables such as, e.g., weather variables, and analyze price volatility, e.g., by identifying the index variable.

The classification module may, for example, determine the classification boundary, e.g., the strike level for the index variable, and may classify the risk generating events in the index series, for example, using ML supervised learning techniques such as, e.g., binary classification.

In risk management layer 408, financial risk scenarios 424 are generated based on the output of the ML model and alternative risk management and pricing strategies 426 are determined.

The risk management layer 408 may be configured to identify or learn a suitable financial hedging instrument and indicative pricing from the available preprocessed data. Risk management layer 408 may employ an optimization algorithm to determine a trade-off between price and price volatility and to suggest a hedging strategy based on the trade-off. In some aspects, the strategy may be evaluated on the testing data and the process may be repeated on alternative data segments, e.g., additional sets of testing data, until the evaluation conditions are satisfied.

Figure 5:
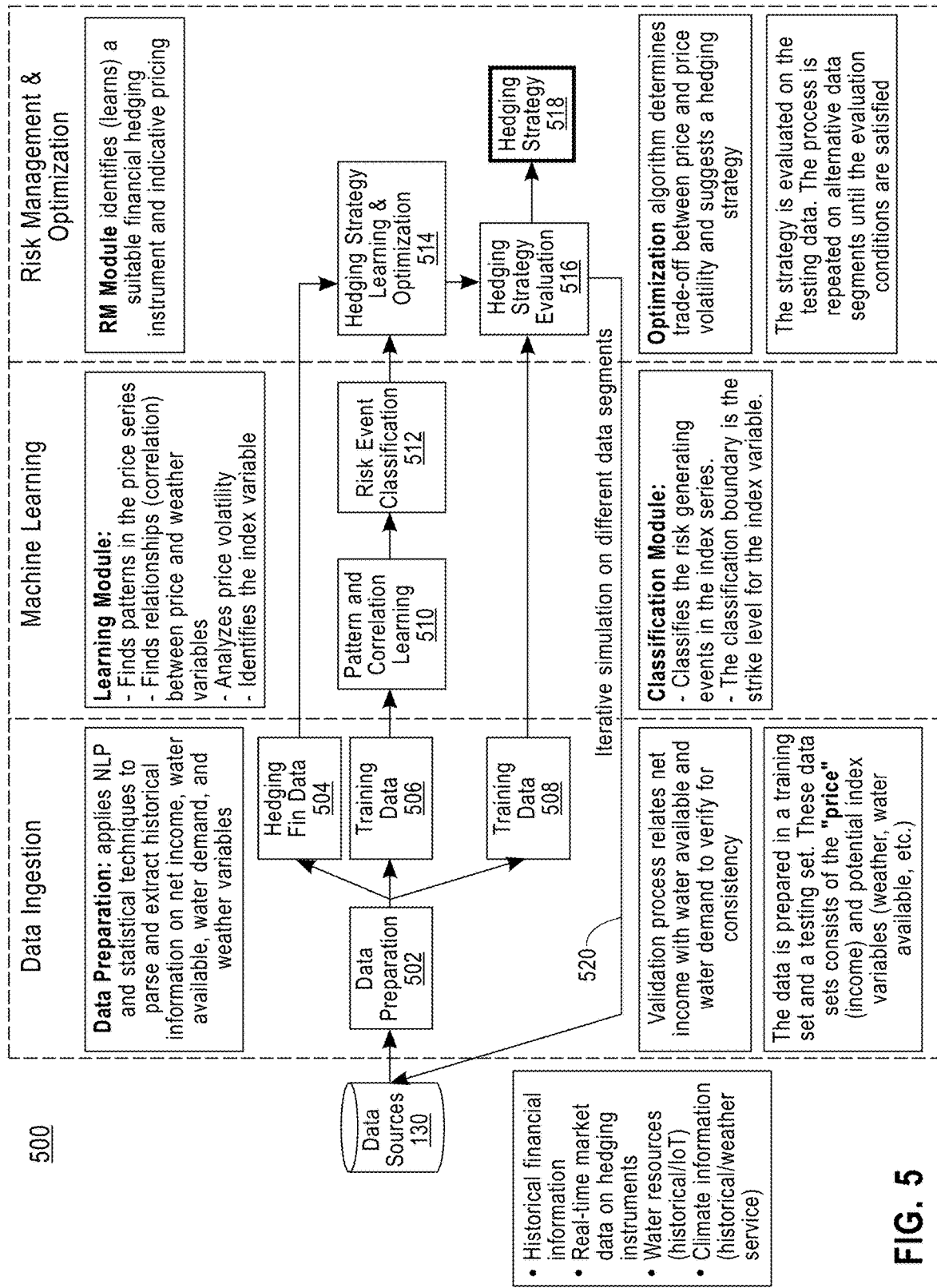
FIG. 5 is a flow chart of a method for protecting a water providing entity in accordance with some aspect of the present disclosure.

With reference now to FIG. 5, a method 500 for protecting a municipality from catastrophic weather effects on water resources is illustrated.

At 502, data is received at the acquisition layer 402 from data sources 130, sensors 180, or both as described above. At the ingestion layer 404, the data is prepared by applying cognitive processing, e.g., NLP, and pre-processing, e.g., statistical techniques, to parse and extract information on net income, water availability, water demand, and weather variables, hedging financial data, or any other information related to water resources or usable for protecting the municipality and to convert each data item to a time series over a pre-determined period of time. In some aspects, the pre-determined period of time may be determined by system 100 based on the available data. In some aspects a user of computing device 110 may specify or set the pre-determined period of time, e.g., using input device 120.

Next ingestion layer 404 separates out the extracted data at 504, 506, and 508 into component parts. For example, at 504, any hedging financial data extracted from data sources 130 or sensors 180 is separated out for later use by the risk management layer 408.

At 506, a portion of the remaining extracted data about the water resources may be designated for use as a training data set and at 508, another portion of the remaining extracted data may be designated for use as testing data set. The designation of the remaining extracted data as either a training data set or testing data set may be determined using common machine learning or data processing techniques. For example, the remaining extracted data may be separated into first and second portions of equal size for each of the training and testing data sets. In another example, a greater portion of the remaining extracted data may be use for the training data set while a smaller portion may be used for the testing data set. In yet another example, a smaller portion of the remaining extracted data may be used for the training data set while a greater portion of the extracted data may be used for the testing data set.

In some aspects, for example, the separation between training and testing data may be determined by the volume of data available and the need to balance variance in the both partitions. Variance in the training set is related to the parameter estimates such as, e.g., classification thresholds, risk generating events, etc., while in the training set variance is related to the performance statistics, e.g., essentially income or revenue which is what is being maximized.

As a starting condition, for example, data may be split following an 80/20 percent rule (training/testing). Random selections may be sampled within the available data following this rule and the ML models may be trained with each sample. The results may be applied to the testing set, and the performance results may be recorded. The process may be repeated automatically with other percent partitions of training/testing data, e.g., 70/30, 60/40, 50/50, etc. In some aspects, the partition leading to the least variance in both sets may be finally selected.

In some aspects, the training data set and testing data set may include a price, e.g., municipal income from water resources, and potential index variables, e.g., weather, water availability, etc., that may affect the price. For example, the training data set and testing data set may include price or other index variables in time series over a pre-determined period of time.

At 510, the training data set is used to train the ML module at the ML prediction layer 406. For example, the ML module may be trained to find patterns in the price series, find a correlation between price and index variables, analyze price volatility, identify an index variable, or perform other similar determinations based on the training data.

In some aspects, for example, the ML module may be trained using clustering through multivariate statistical techniques and via kernel methods for unsupervised learning. In some aspects, additional or alternative techniques for training the ML module may be utilized including, for example, logistic regression, support vector machine (SVM), Naive Bayes, K-Nearest Neighbors (KNN), K-means, deep learning, or other similar ML training techniques.

At 512, the trained ML module may classify risk generating events in the index series. For example, the trained ML module may compare the different index series to determine a correlation between the changes in the data, e.g., low rainfall may be correlated with increased net income while high rainfall may be correlated with increased losses. Based on the correlation of the index series, the ML module may determine a classification boundary of the index series as the strike level for the index variable.

In some aspects, for example, the classification boundary may represent a threshold that may be used to distinguish between events in the index series that have a higher probability to cause risk, e.g., loss of revenue or low income, in the price series. For example, the classification boundary may be determined through ML methods such as, e.g., correlation analysis, hypothesis testing, support vector machine (SVM), naïve Bayes, or other ML based techniques.

At 514, a risk management (RM) module is trained to generate an optimized hedging strategy based on the output of the ML module and the hedging financial data from step 504. The RM module identifies (learns) a suitable financial hedging instrument and indicative pricing. In some aspects, the RM module algorithm is optimized by determining a trade-off between price and price volatility and may suggest a hedging strategy. For example, the RM module may apply a simulation-optimization approach using a Monte Carlo (MC) based generation mechanism. The MC algorithm may randomize the selection of segments, e.g., the segment split in training/testing data as described above, within the historical data, e.g., the data from the data sources. Each segment may be analyzed with modules I (data ingestion), II (Machine Learning), and III (Risk Management and Optimization. For example, modules II and III may be applied to each segment after pre-processing is performed by module I. The results from modules II and III for each segment may be combined with a scenario hedging strategy (from available financial market alternatives) to generate several points on an income-volatility curve. A non-dominated sorting algorithm may be applied to select the best points among all the simulated solutions. The selected best points, or all of the generated points, may be provided to a decision maker, e.g., via display 118 of computing device 110, and the decision maker may then select a risk management scenario. In some aspects, the risk management scenario that meets a particular set of evaluation criteria may also or alternatively be selected automatically by computing device 110 or server 200. The evaluation criteria may include, for example, projected profit in combination with its variance where the goal is having a maximum profit with the least variance.

In an example, the data may be split using an 80/20 ratio (training/testing). From the data, the MC sampler may select a random portion using this 80/20 rule. Modules II and III may be applied to the training data and module III, several solutions may be produced. In this example, the solution producing the best projected profit is selected and the solution's parameters may be applied to the validation set. The results of this application may be recorded such that the selected scenario e.g., hedging mechanism, classification thresholds, etc., may be applied to the testing data and the profit it produces may further be recorded.

The MC sampler may select several other samples and the same process above may be applied. The solution parameters and profit projections may have their associated variances with the goal being to have the least variance possible, e.g., have a variance that is below a pre-determined threshold amount. This process may be repeated starting from a different partition rule, e.g., 90/10, 70/30, 60/40, 50/50, etc., and eventually the partition leading to the least variance or a variance below the pre-determined threshold variance may be selected.

At 516, the generated hedging strategy is evaluated against the testing data set from step 508 to determine whether the evaluation criteria is satisfied, e.g., to determine whether the hedging strategy protects the municipality from catastrophic losses due to environmental effects or provide minimum revenue risk for the municipality (e.g., protect the municipality from going cash-flow negative in any given year). If the hedging strategy does not satisfy the evaluation criteria, the results may be fed back into or otherwise provided to database 130 along feedback line 520 and the process of data ingestion, training of the ML module, and training/applying the RM module may be performed again on one or more alternative data segments. This feedback loop may be iteratively performed until the evaluation criteria conditions are satisfied.

At 518, when a hedging strategy satisfies the evaluation criteria, the hedging strategy may be selected for use by the municipality or output to display 118 for review by a user of computing device 110.

System 100 provides a tool that may be used by municipalities in the water sector by combining heterogeneous information using cognitive computing, analyzing financial investment risk and strategies using machine learning, and suggesting investment decisions that correspond to the minimum revenue risk.

Example Application

With reference now to FIGS. 6-15, an example application of system 100 will now be described.

In the example, a water supplier A sells approximately 50% of its water during the peak season (mid June-mid September). Peak season sales are important for water supplier A to recover its operational costs of €120M. Irrigation is a major component of the water use. When a higher than normal rainfall occurs, revenues are reduced, e.g., water consumption is reduced because less irrigation is needed, and water supplier A fails to meet its operational costs. The water supplier A may utilize system 100 to determine a risk management strategy to hedge against the revenue loss.

Figure 6:
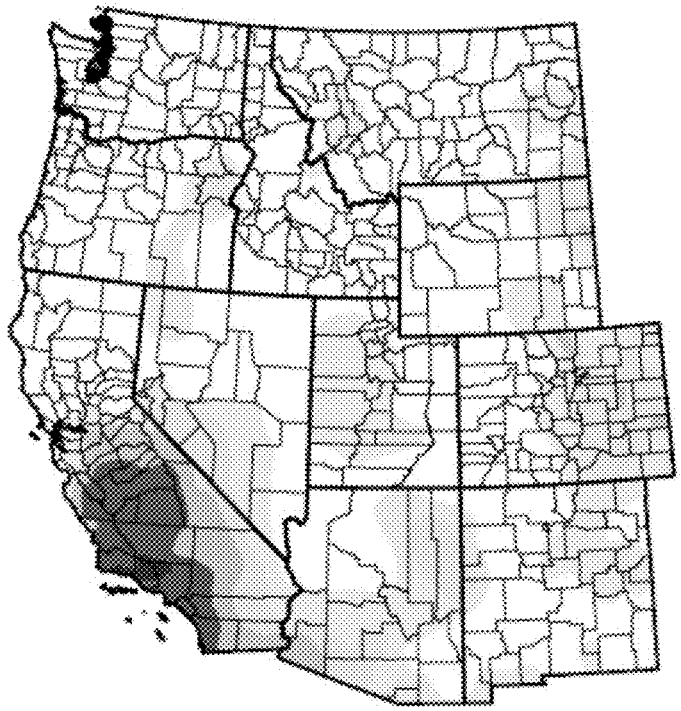
Figure 7:
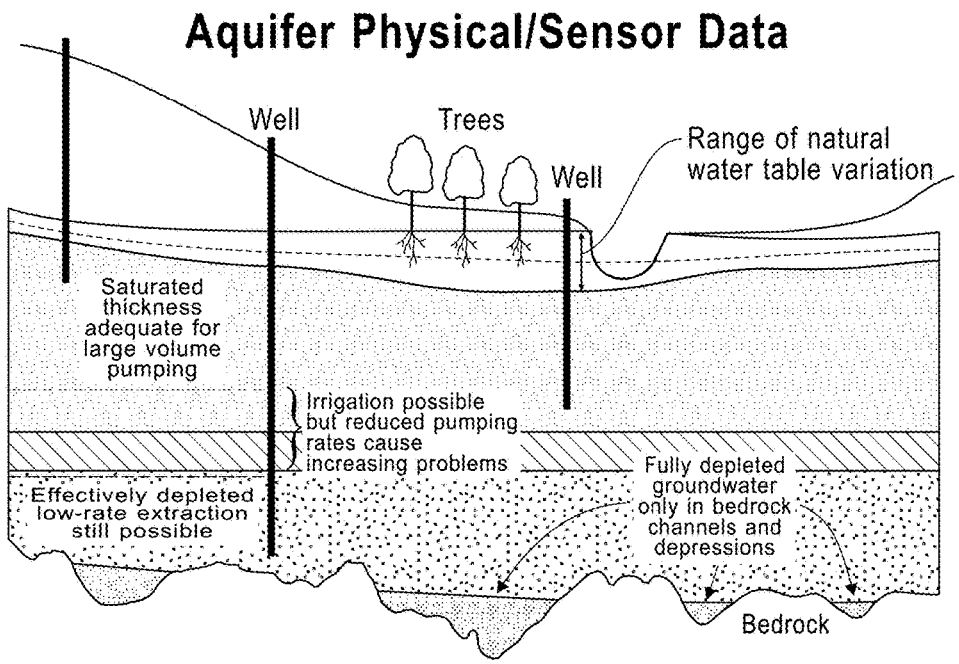
Figure 8:
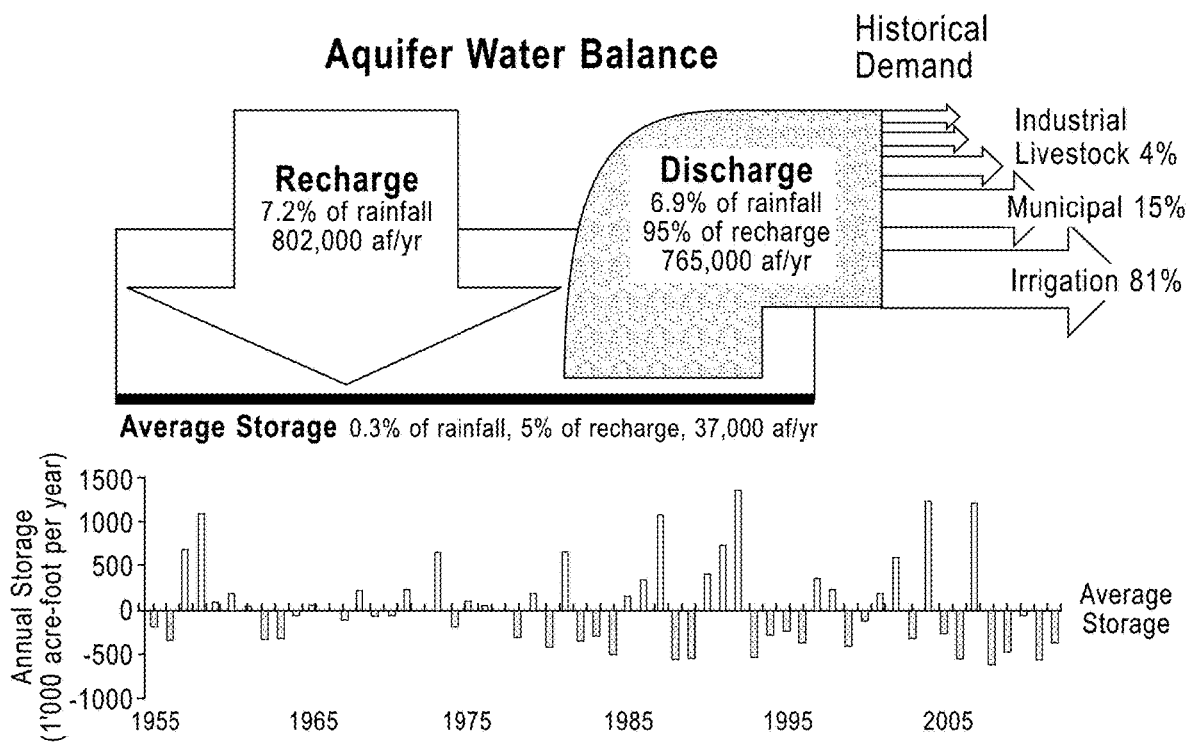
Figure 10:
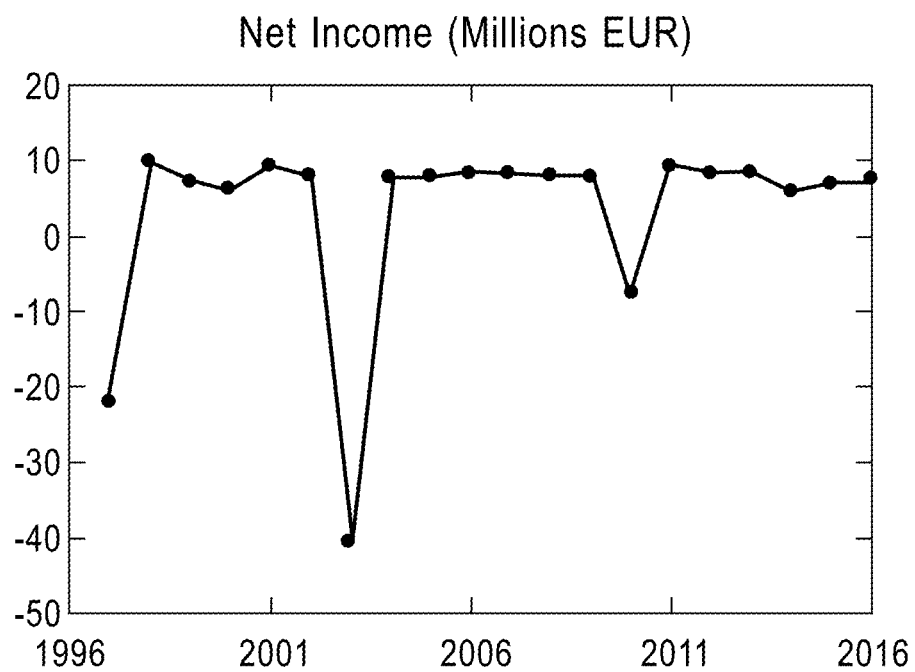
FIG. 10 is a time series chart of net income of a water providing entity that may be generated during data ingestion in accordance with some aspect of the present disclosure.
Figure 11:
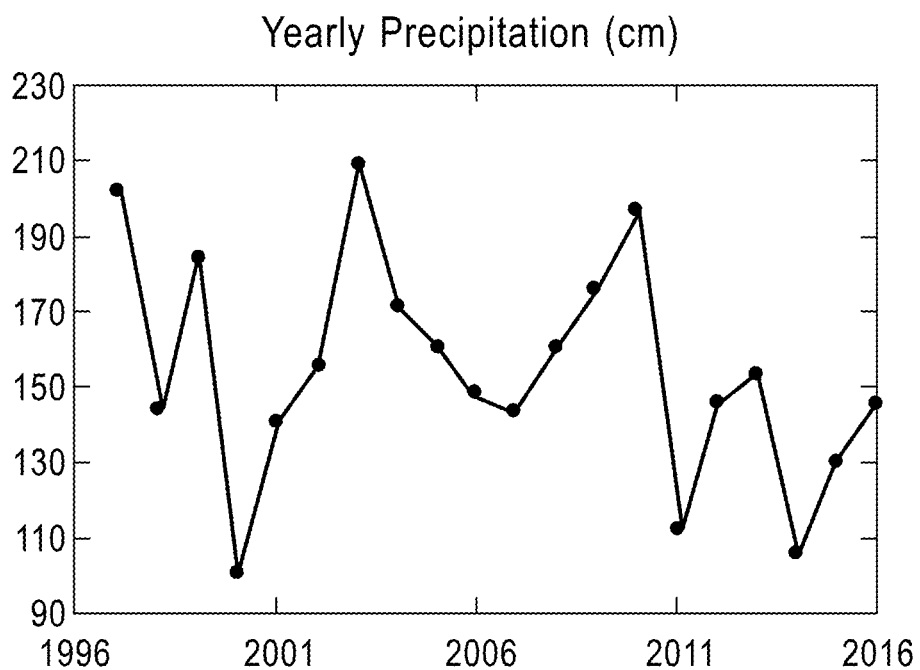
FIG. 11 is a time series chart of yearly precipitation that may be generated during data ingestion in accordance with some aspect of the present disclosure.

I. Data Input:

The data acquisition layer 402 acquires or receives data on financial reports, water resources, water demand, weather station data (if available), or other data sources 130. With reference to FIG. 6, example rainfall or drought condition data for a region may be acquired, e.g., from a data source 130 related to the region. Data about aquifer saturation and depletion levels may be acquired, e.g., from sensors 180 or data sources 130 that store aquifer saturation and depletion data as illustrated in FIG. 7, data about aquifer recharge and discharge rates, annual storage, and current or historical demand levels may be acquired, for example, from sensors 180 or data sources 130 that store aquifer recharge, discharge, storage, and demand data, as illustrated in FIG. 8, and financial reports regarding the municipalities income and expenditures for water resources may be acquired, e.g., from the data sources 130 associated with the municipality, as illustrated in FIG. 9.

Accepted data types may include, for example, structured data (e.g., from relational databases), and semi-structured or unstructured (e.g., text, csv, pdf, sensor platform, accessible through public/private API service, etc.). Water provider A may, for example, provide financial spreadsheet reports (e.g., csv, text), aquifer level data (e.g., csv and sensors via representation state transfer (REST) service uniform resources locator (URL)), volumes of water sold from billing (e.g., csv format) and weather station data if available. Some or all of this data may be obtained from data sources 130 other than water provider A.

II. Data Ingestion:

The data ingestion layer 404 applies cognitive data ingestion techniques to read and generate a structure/context for the semi-structured data (e.g., csv) and processes the unstructured data (e.g., text) using NLP, e.g., using ontology libraries associated with the type of unstructured data. In some aspects, for example, ingestion of the financial data of the water provider A may output a historical time series of net income as illustrated, for example, in FIG. 10.

Historical data about water levels (e.g., csv) in the aquifer may be combined with sensor data taken from the IoT (Internet of Things) aquifer level sensors (e.g., available via a REST application program interface (API)) and a water balance may be determined. The ingestion of water resource data may generate a historical time series of water available to sell as an output.

Water demand may be calculated from the financial data on volume of water sold, e.g., as acquired or received from one of data sources 130 or from water provider A. The ingestion of the water demand data may generate a time series of historical water demand as an output.

Weather data on rainfall may be obtained from a data source 130 such as, e.g., the nearest station of the local weather service. The weather data may be processed to obtain a time series of historical precipitation as an output as illustrated, for example, in FIG. 11.

The data ingestion layer 404 may analyze and relate the time series of net income, water available, water demand and may verify that these three time series are consistent (e.g., are determined over the same time frame).

Figure 12:
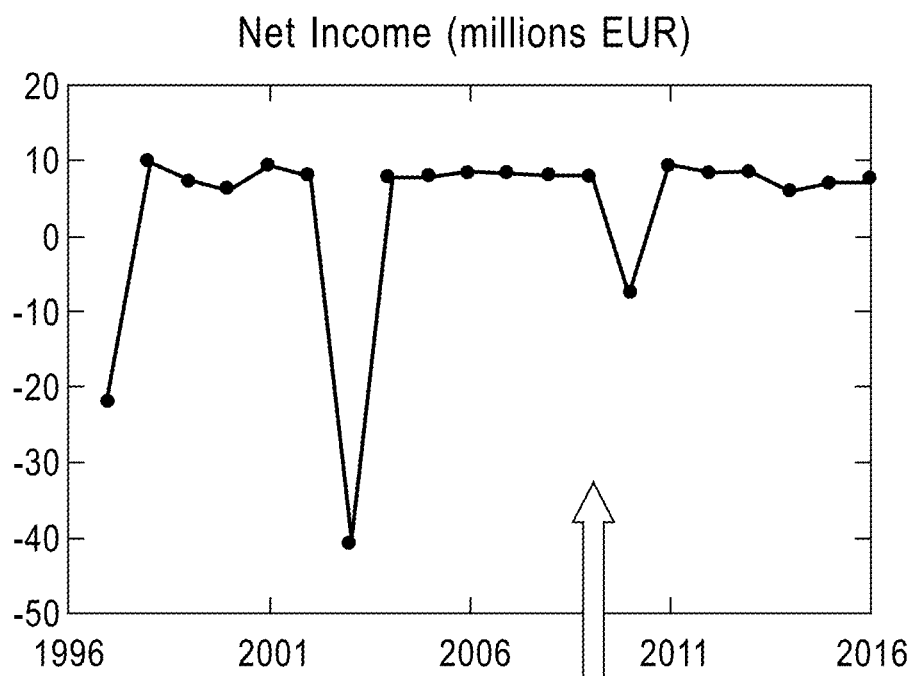
FIGS. 12 and 13 illustrate a correlation between the charts of FIGS. 10 and 11 that may be determined by a machine learning module in accordance with some aspect of the present disclosure.
Figure 13:
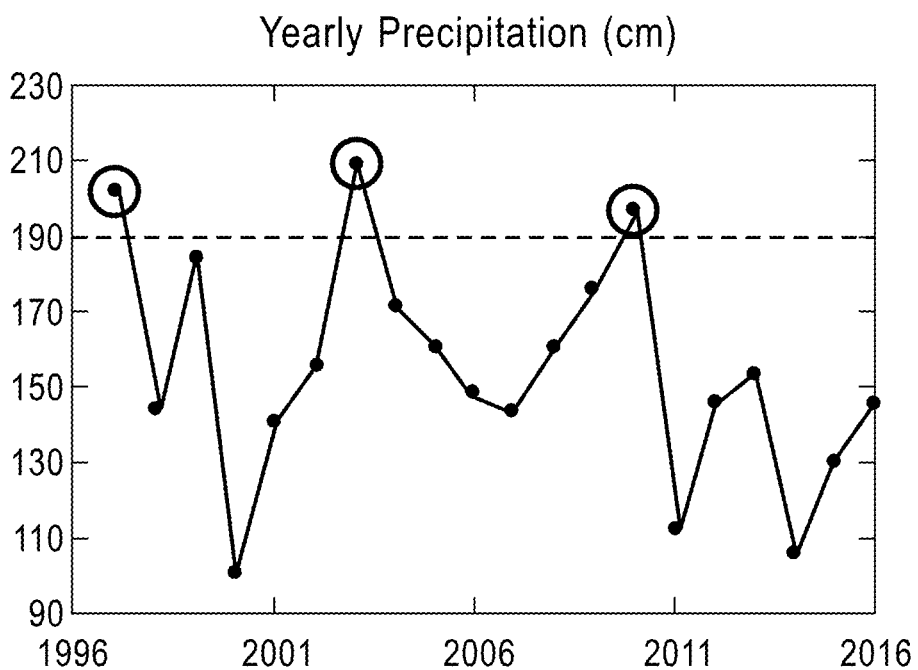

III. Machine Learning (ML):

As an example, the ML module of the ML prediction layer 406 may be analyze the training time series of net income (FIG. 10) and cumulative rainfall (FIG. 11) to determine: (1) volatility in net income, (2) correlation between net income and weather events, (3) patterns in the loss of revenue. For example, as illustrated in FIGS. 12 and 13, the ML module may identify the weather events that had most negative impact to the net income of the water provider A. As illustrated in FIGS. 12 and 13, for example, losses were significant (e.g., >€8 million) in years 1997, 2003, and 2010 which correspond to years of higher than average precipitation. Using classification techniques, the ML module may compute a risk boundary or rainfall strike level. The ML module may output a suggested strike level of 190 cm based on the computations. The ML module may also forecast the potential risk of such losses in the future based on an analysis of the periodicity of high rainfall. For example, since the rainfall appears to rise above the suggested strike level every six or seven years, the ML module may indicate a medium-high risk of high rainfall in the incoming operational year (7 years from the last rainfall exceeding the suggested strike level).

IV. Risk Management (RM):

The RM module in the RM layer 408 may select a type of derivative from the market by either (1) user input, or (2) running simulations for alternative available products (e.g., swap, collar, option, series of options, or other available products).

In some aspects, for example, a query of available financial products that the utility may purchase may be performed. Simulations may be run where the inputs are each available type of product. For example, the available products may be options and series of options. The first simulation that may be executed may consider options. A second simulation that may be executed may consider series of options. The output may be a suggested hedging strategy. The simulations may be combined using the data partitioning explained above.

Figure 14:
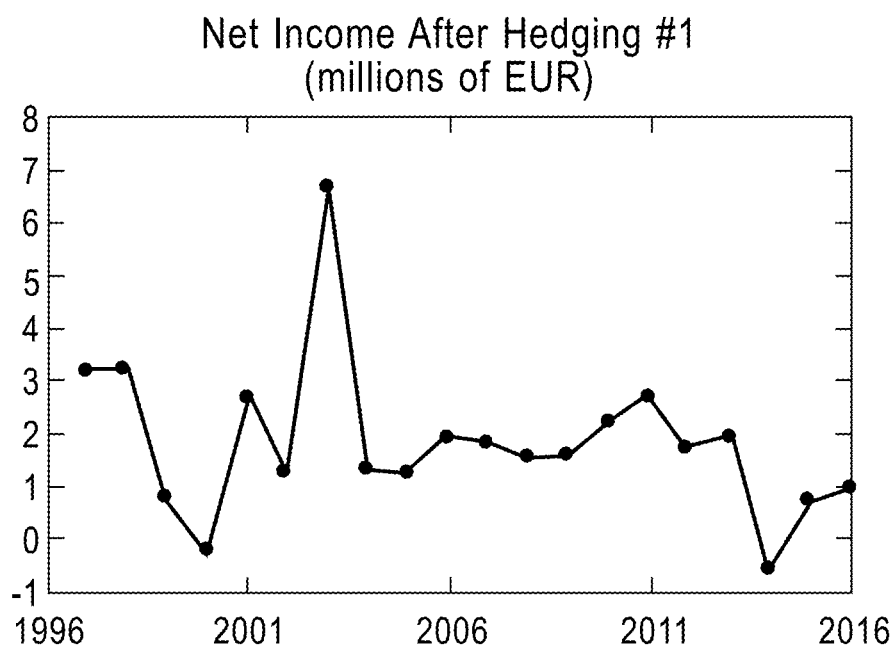
FIG. 14 is a time series chart of net income of the water providing entity after a hedging strategy has been applied in accordance with some aspect of the present disclosure.
Figure 15:
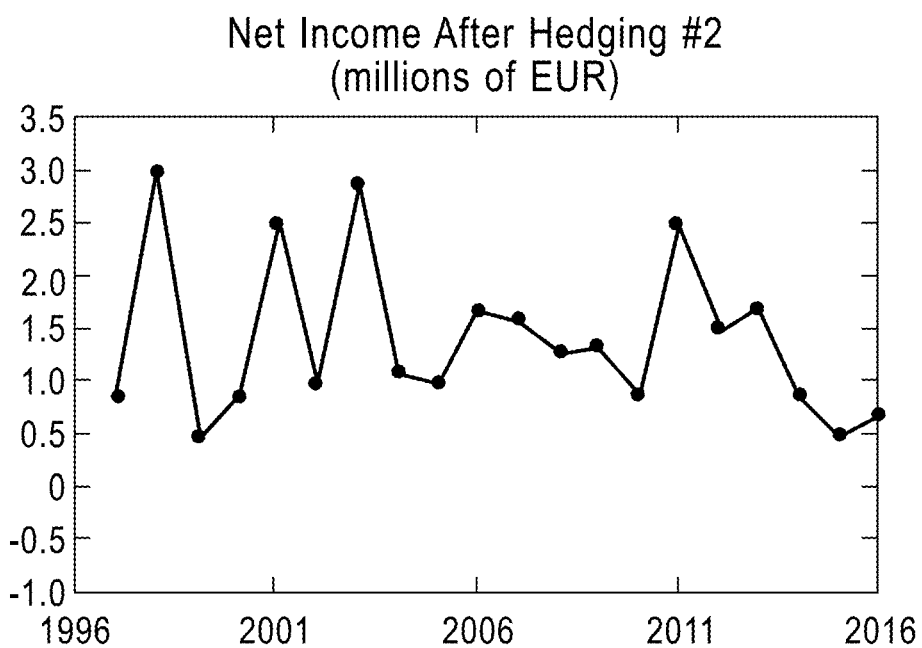
FIG. 15 is a time series chart of net income of the water providing entity after the hedging strategy of FIG. 14 and an additional hedging strategy have been applied in accordance with some aspect of the present disclosure.

In some aspects, for example, the output may be in the form of options or series of options. The indicative price for options is the average forecasted gross payout plus 12.5% of its standard deviation. The optimization algorithm uses the strike level of 190 cm found by ML module and the reference price for option calls and finds a trade-off curve between average net income and net income volatility. The RM module then suggests a solution: buy a Cumulative Rainfall call option for €6.3 million annual premium which pays €2.76M per cm above a strike level of 190 cm. Applying this suggested solution to the yearly precipitation shown in FIG. 11 results in an income time series as illustrated in FIG. 14. As seen in FIG. 14, applying this solution reduces the net income that the water provider A may receive in a given year but also reduces the maximum losses that the water provider A may lose in a given year. In some aspects, for example, during especially high rainfall scenarios, the water provider A may actually receive increased income due to the call option.

While the suggestion by the RM module may provide some relief to the water provider A, RM module may also recognize that the suggested call option does not fully protect the water provider A since there are still years with negative income (e.g., 2000, 2014). In response to determining that there are still years with negative income, the RM module may suggest an additional hedging instrument, e.g., purchase a small put option on cumulative rainfall that covers €1.5M in losses for approximately €140K. The put option structure provided has reduced the average profit, but has left the utility with an economic profile with much lower variability as illustrated, for example, in FIG. 15. The solution is evaluated with the testing data and a quality score, e.g., evaluation criteria as described above, is computed based on the cost-benefit ratio both in training and testing.

In some aspects, the example simulation process may be repeated with different data segments of the training data set and testing data set. The solution with the best score, e.g., meeting the evaluation criteria for maximum profit with the least variance, may be presented to the user.

In some aspects, the above described system combines structured and unstructured information about water resources (aquifer) characteristics, water demand, financial instruments, and water pricing with machine learning module to process ingested data and forecast relevant variables for the purpose of hedging water investments, select a list of feasible hedging instruments, and apply a risk management module that prices chosen financial instruments/strategies to hedge water investments.

Figure 16:
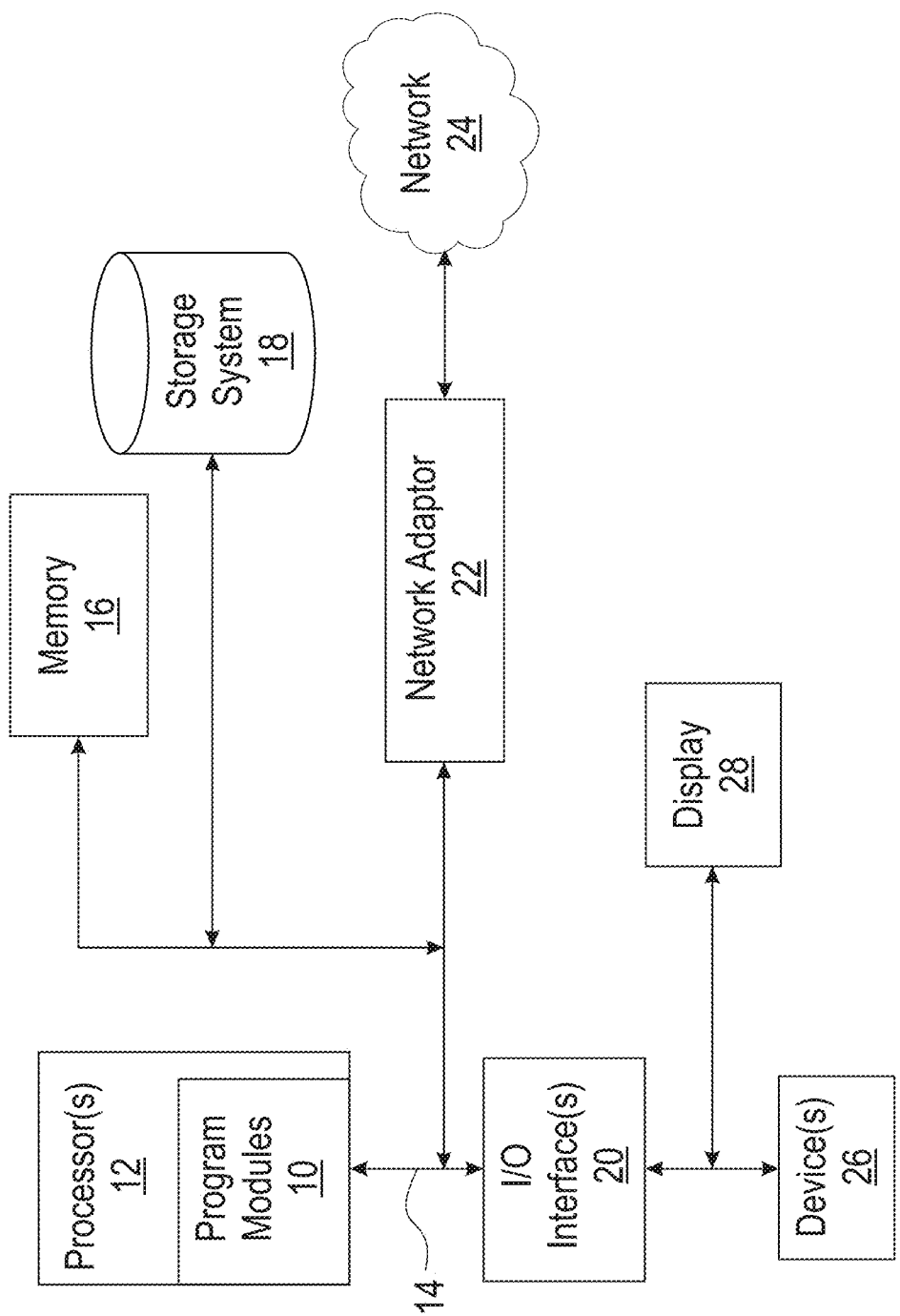
FIG. 16 is an exemplary block diagram of a computer system in which processes involved in the system, method, and computer program product described herein may be implemented.

FIG. 16 illustrates a schematic of an example computer or processing system that may implement any portion of system 100, computing device 110, data sources 130, sensors 180, server 200, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 17:
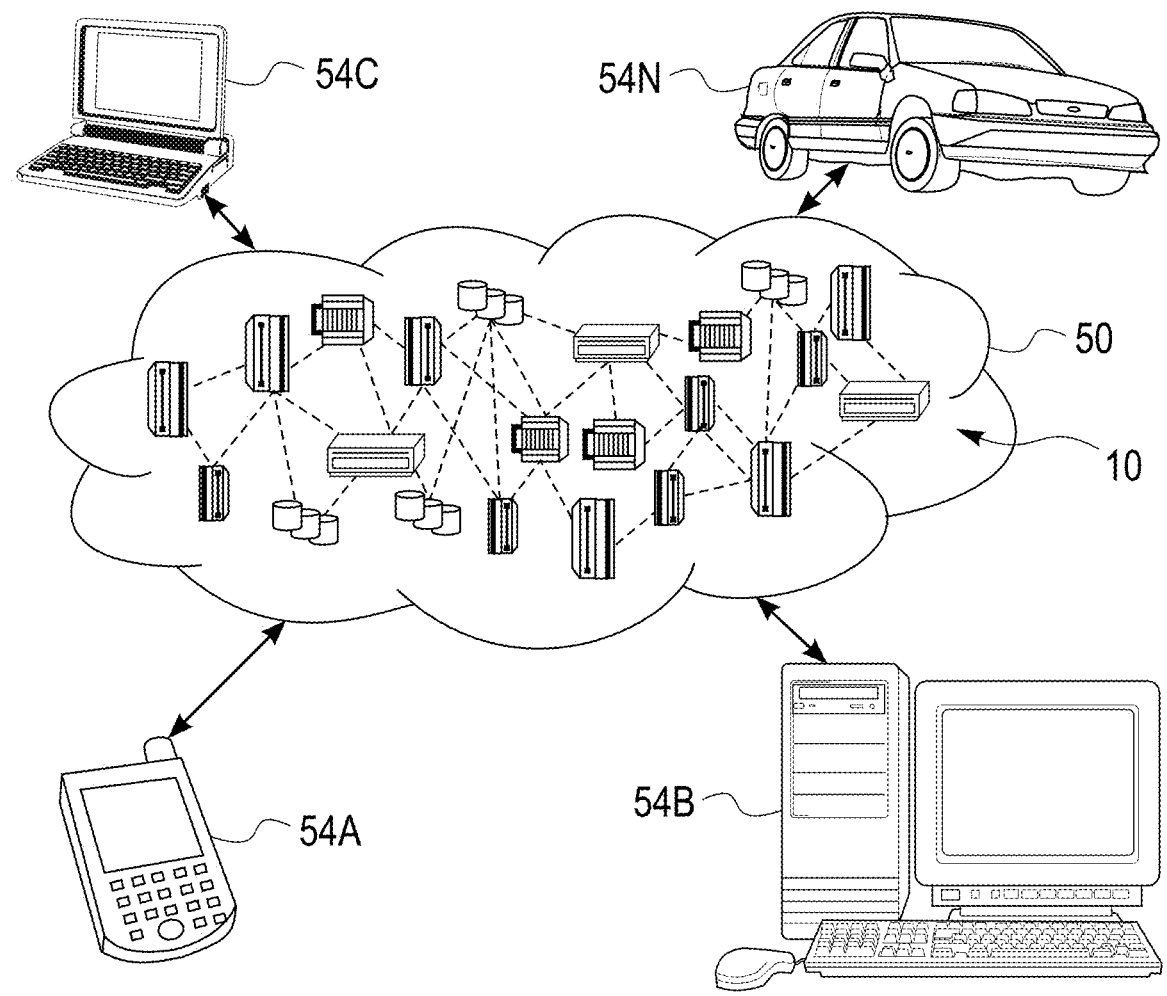
FIG. 17 depicts a cloud computing environment according to an embodiment of the present invention.

Referring now to FIG. 17, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 17 are intended to be illustrative only and that computing nodes 10 and cloud computing environment 50 can communicate with any type of computerized device over any type of network and/or network addressable connection (e.g., using a web browser).

Figure 18:
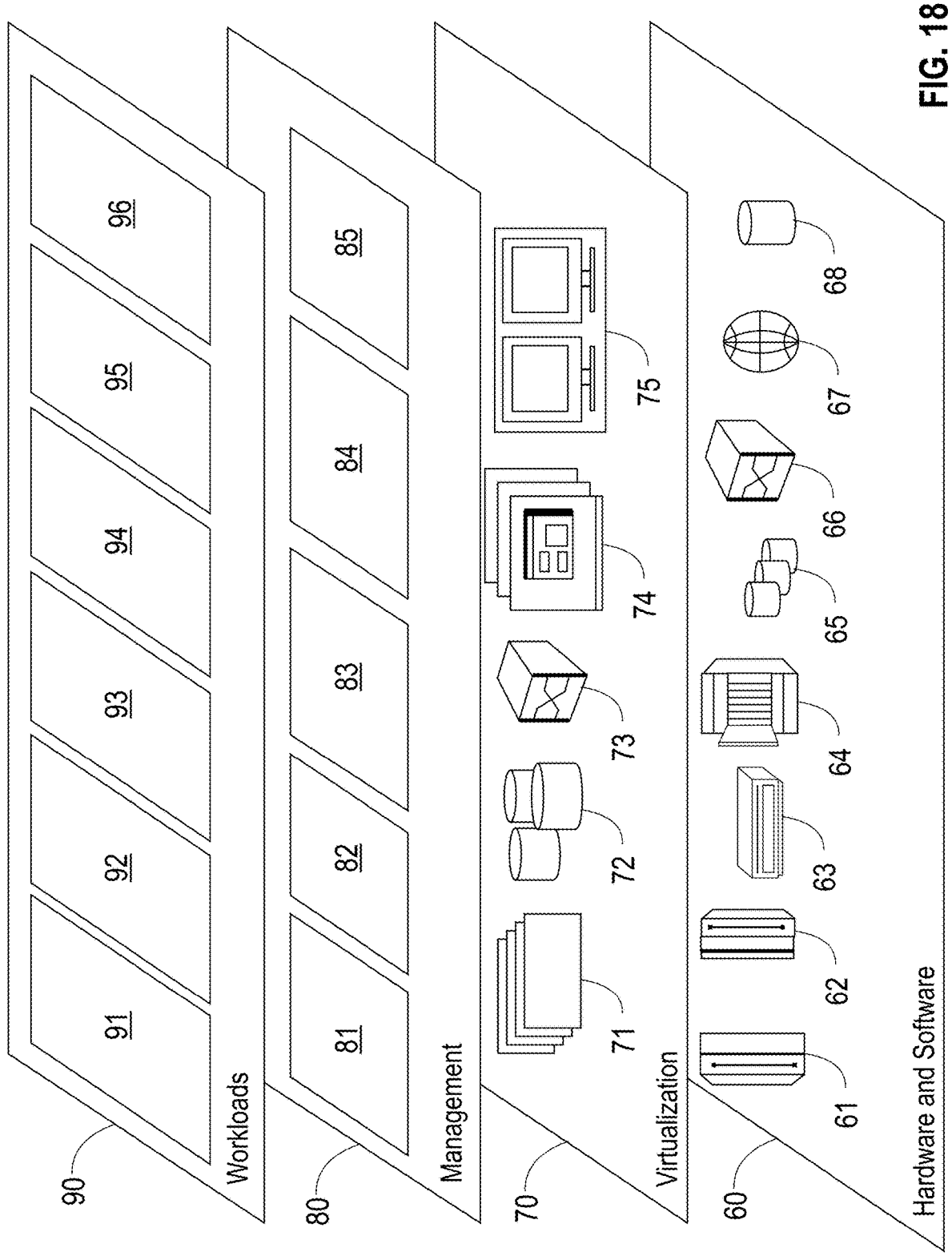
FIG. 18 depicts abstraction model layers according to an embodiment of the present invention.

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and natural language processing 96.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one processor of a computer device, comprising hardware, the method comprising:

receiving, by the at least one processor, structured and unstructured data related to a water resource from one or more data sources;

generating, by the at least one processor, time series data for a plurality of index items in the structured and unstructured data, the time series data for the plurality of index items comprising time series financial data of a water providing entity over a pre-determined period of time, time series water resource availability data over the pre-determined period of time, time series water consumption demand data over the pre-determined period of time, and time series weather effect variables data on a water resource over the pre-determined period of time;

generating, by the at least one processor, training data and testing data based on the time series data for the plurality of index items;

running, by the at least one processor, a stored machine learned model trained to determine correlations between the financial data time series data and the water resource availability time series data, the water consumption demand time series data, and the weather effect variables time series of the index items using the generated training data and to obtain from said determined correlations a target index item corresponding to a financial data exhibiting a volatility indicating a financial loss to be hedged against;

determining, by the at least one processor, one or more events most impactful from that target index item;

determining, using said trained stored model, a classification boundary based on the determined one or more events;

setting, by the at least one processor, the classification boundary as a strike level, the strike level comprising a rainfall event exceeding a risk causing threshold;

generating, by the at least one processor, a hedging strategy based on the set strike level, said generating a hedge strategy comprising identifying a hedging instrument for use in the hedging strategy, said generating a hedging strategy comprising:

using a Monte Carlo (MC) based generator to randomize a selection of segments used to train the machine learned model, said segments being split in training/testing the stored model;

applying, for each segment, said machine learning and combining results of said machine learning with a scenario hedging strategy to generate one or more points on an income-volatility curve;

applying a non-dominated sorting to select the points among all the simulated solutions for use in selecting a risk management scenario;

presenting said selected points to a user via the computing device;

receiving via the computing device, based on said selected points, a user selection of a risk management scenario to meet a particular set of evaluation criteria; and iteratively repeating said training of the ML model using one or more alternative data segments and hedging strategies until a set of evaluation criteria conditions are satisfied;

applying, by the at least one processor, the hedging strategy to the testing data to generate a resulting financial data time series that takes into account the hedging strategy;

presenting the resulting financial data time series via a display of the computing device to at least one user of the computing device; and using, by the at least one processor, the identified hedging instrument to reduce the financial loss based on said hedging strategy.

2. The method of claim 1, further comprising:

determining that the resulting financial data time series fails to meet a predetermined criteria;

determining an additional hedging strategy;

applying the hedging strategy and the additional hedging strategy together to the testing data to generate a second resulting financial data time series that takes into account the hedging strategy and the additional hedging strategy; and presenting the second resulting financial data time series via the display of the computing device to the at least one user of the computing device.

3. The method of claim 1, wherein the financial data time series comprises net income of the water providing entity over the pre-determined period of time.

4. The method of claim 1, wherein generating a hedging strategy based on the set strike level comprises training a risk management module to identify the hedging instrument for use in the hedging strategy.

5. The method of claim 1, further comprising optimizing the generated hedging strategy by determining a trade-off curve between average net income and net income volatility of the water provider.

6. The method of claim 1, wherein generating time series for a plurality of index items in the structured and unstructured data comprises pre-processing the structured data and performing natural language processing (NLP) on the unstructured data to generate the time series for a plurality of index items in the structured and unstructured data.

7. A system comprising:
at least one processor of a computer device comprising hardware, the at least one processor configured to:
receive structured and unstructured data related to a water resource from one or more data sources;
generate time series data for a plurality of index items in the structured and unstructured data, the time series data for the plurality of index items comprising time series financial data of a water providing entity over a pre-determined period of time, time series water resource availability data over the pre-determined period of time, time series water consumption demand data over the pre-determined period of time, and time series weather effect variables data on a water resource over the pre-determined period of time;
generate training data and testing data based on the time series data for the plurality of index items;
run a stored machine learned model trained to determine correlations between the financial data time series data and the water resource availability time series data, the water consumption demand time series data, and the weather effect variables time series of the index items using the generated training data and to obtain from said determined correlations a target index item corresponding to a financial data exhibiting a volatility indicating a financial loss to be hedged against;
determine one or more events most impactful from that target index item;
determine a classification boundary based on the determined one or more events;
set the classification boundary as a strike level, the strike level comprising a rainfall event exceeding a risk causing threshold;
generate a hedging strategy based on the set strike level, said generating a hedge strategy comprising identifying a hedging instrument for use in the hedging strategy, wherein to generate a hedging strategy, said at least one processor is further configured to:
use a Monte Carlo (MC) based generator to randomize a selection of segments used to train the machine learned model, said segments being split in training/testing the stored model;
apply, for each segment, said machine learning and combining results of said machine learning with a scenario hedging strategy to generate one or more points on an income-volatility curve;
apply a non-dominated sorting to select the points among all the simulated solutions for use in selecting a risk management scenario;
present said selected points to a user via the computing device;
receive via the computing device, based on said selected points, a user selection of a risk management scenario to meet a particular set of evaluation criteria; and
iteratively repeat said training of the ML model using one or more alternative data segments and hedging strategies until a set of evaluation criteria conditions are satisfied;
apply the hedging strategy to the testing data to generate a resulting financial data time series that takes into account the hedging strategy;
present the resulting financial data time series via a display of the computing device to at least one user of the computing device, and
use the identified hedging instrument to reduce the financial loss based on said hedging strategy.

8. The system of claim 7, the at least one processor further configured to:
determine that the resulting financial data time series fails to meet a predetermined criteria;
determine an additional hedging strategy;
apply the hedging strategy and the additional hedging strategy together to the testing data to generate a second resulting financial data time series that takes into account the hedging strategy and the additional hedging strategy; and
present the second resulting financial data time series via the display of the computing device to the at least one user of the computing device.

9. The system of claim 7, wherein the financial data time series comprises net income of the water providing entity over the pre-determined period of time.

10. The system of claim 7, wherein generating a hedging strategy based on the set strike level comprises training a risk management module to identify the hedging instrument for use in the hedging strategy.

11. The system of claim 7, the at least one processor further configured to optimize the generated hedging strategy by determining a trade-off curve between average net income and net income volatility of the water provider.

12. The system of claim 7, wherein generating time series for a plurality of index items in the structured and unstructured data comprises pre-processing the structured data and performing natural language processing (NLP) on the unstructured data to generate the time series for a plurality of index items in the structured and unstructured data.

13. A non-transitory computer readable medium comprising instructions that, when executed by at least one processor of a computer device, configure the at least one processor to:
receive structured and unstructured data related to a water resource from one or more data sources;
generate time series data for a plurality of index items in the structured and unstructured data, the time series data for the plurality of index items comprising time series financial data of a water providing entity over a pre-determined period of time, time series water resource availability data over the pre-determined period of time, time series water consumption demand data over the pre-determined period of time, and time series weather effect variables data on a water resource over the pre-determined period of time;
generate training data and testing data based on the time series data for the plurality of index items;
run a stored machine learned model trained to determine correlations between the financial data time series data and the water resource availability time series data, the water consumption demand time series data, and the weather effect variables time series of the index items using the generated training data and to obtain from said determined correlations a target index item corresponding to a financial data exhibiting a volatility indicating a financial loss to be hedged against;

determine one or more events most impactful from that target index item;

determine a classification boundary based on the determined one or more events;

set the classification boundary as a strike level, the strike level comprising a rainfall event exceeding a risk causing threshold;

generate a hedging strategy based on the set strike level, said generating a hedge strategy comprising identifying a hedging instrument for use in the hedging strategy, wherein to generate a hedging strategy, the instructions further configure the at least one processor to:

use a Monte Carlo (MC) based generator to randomize a selection of segments used to train the machine learned model, said segments being split in training/testing the stored model;

apply, for each segment, said machine learning and combining results of said machine learning with a scenario hedging strategy to generate one or more points on an income-volatility curve;

apply a non-dominated sorting to select the points among all the simulated solutions for use in selecting a risk management scenario;

present said selected points to a user via the computing device;

receive via the computing device, based on said selected points, a user selection of a risk management scenario to meet a particular set of evaluation criteria; and iteratively repeat said training of the ML model using one or more alternative data segments and hedging strategies until a set of evaluation criteria conditions are satisfied;

apply the hedging strategy to the testing data to generate a resulting financial data time series that takes into account the hedging strategy;

present the resulting financial data time series via a display of a computing device to at least one user of the computing device, and use the identified hedging instrument to reduce the financial loss based on said hedging strategy.

14. The non-transitory computer-readable medium of claim 13, the instructions further configuring the at least one processor to:

determine that the resulting financial data time series fails to meet a predetermined criteria;

determine an additional hedging strategy;

apply the hedging strategy and the additional hedging strategy together to the testing data to generate a second resulting financial data time series that takes into account the hedging strategy and the additional hedging strategy; and present the second resulting financial data time series via the display of the computing device to the at least one user of the computing device.

15. The non-transitory computer-readable medium of claim 13, wherein the financial data time series comprises net income of the water providing entity over the predetermined period of time.

16. The non-transitory computer-readable medium of claim 13, wherein generating a hedging strategy based on the set strike level comprises training a risk management module to identify the hedging instrument for use in the hedging strategy.

17. The non-transitory computer-readable medium of claim 13, the instructions further causing the at least one processor to optimize the generated hedging strategy by determining a trade-off curve between average net income and net income volatility of the water provider.

* * * * *